(12) United States Patent
Dwyer et al.

(10) Patent No.: US 7,025,462 B2
(45) Date of Patent: Apr. 11, 2006

(54) DISPLAY DEVICE FOR PROJECTING AN IMAGE ALTERNATIVELY ONTO A REMOTE SURFACE AND A REAR PROJECTION SCREEN

(75) Inventors: Daniel R. Dwyer, BattleGround, WA (US); Robert Schneider, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/841,883

(22) Filed: May 6, 2004

(65) Prior Publication Data

US 2005/0248730 A1     Nov. 10, 2005

(51) Int. Cl.
*G03B 21/22* (2006.01)
*G03B 21/14* (2006.01)

(52) U.S. Cl. .................................. 353/71; 353/119
(58) Field of Classification Search ............ 353/71, 353/119
See application file for complete search history.

(56) References Cited

U.S. PATENT DOCUMENTS

| | | | | |
|---|---|---|---|---|
| 4,572,632 A | * | 2/1986 | Bodier et al. ............. | 353/71 |
| 5,090,800 A | * | 2/1992 | Ushiro ....................... | 353/71 |
| 5,235,362 A | * | 8/1993 | Kronbauer ................. | 353/71 |
| 5,381,189 A | | 1/1995 | Terai et al. | |
| 5,642,927 A | | 7/1997 | Booth et al. | |
| 5,876,105 A | | 3/1999 | Rodriquez, Jr. et al. | |
| 6,137,547 A | * | 10/2000 | Iijima et al. .............. | 353/71 |
| 6,179,426 B1 | | 1/2001 | Rodriguez, Jr. et al. | |
| 6,334,687 B1 | * | 1/2002 | Chino et al. ............ | 353/119 |
| 6,604,829 B1 | | 8/2003 | Rodriguez, Jr. | |

FOREIGN PATENT DOCUMENTS

| | | |
|---|---|---|
| JP | 09236871 | 9/1997 |
| WO | WO03/081907 | 10/2003 |

OTHER PUBLICATIONS

European Search Report dated Aug. 4, 2005.

* cited by examiner

Primary Examiner—Christopher Mahoney

(57) ABSTRACT

A display device projects an image alternatively onto a remote surface and a rear projection screen. The display device has a housing, a rear projection screen, a mirrored surface, and a projector. An opening is formed in the upper surface of the housing. The rear projection screen is attached to the housing. The mirrored surface is disposed within the housing and angled to reflect light from the projector onto the rear projection screen. The projector is affixed within the housing and exposable through the opening for selective projection in one position through the opening onto the remote surface and in another position within the housing at the mirrored surface.

30 Claims, 6 Drawing Sheets

DISPLAY DEVICE FOR PROJECTING AN IMAGE ALTERNATIVELY ONTO A REMOTE SURFACE AND A REAR PROJECTION SCREEN

FIELD OF THE INVENTION

This invention relates in general to combination rear projection displays and projectors and, more particularly, to a display device for projecting an image alternatively onto a remote surface and a rear projection screen.

BACKGROUND OF THE INVENTION

Rear projection display devices and projector display devices are useful for displaying images and video streams. Examples of their uses include television and presentations. Although these two types of display devices are similar, they are not identical. It is often desirable to have both a rear projection display device and a projector display device in order to take advantage of the best qualities of each.

Owning one of each type of these display devices is more expensive and requires a larger amount of space than owning only one of these devices. Many times, this requires consumers of display devices to choose between having a rear projection display device and having a projector display device. Once the choice is made, the consumer is unable to take advantage of the best qualities of the device not chosen, unless the consumer acquires that other device.

SUMMARY OF THE INVENTION

According to principles of the present invention, in one embodiment, a display device projects an image alternatively onto a remote surface and a rear projection screen. The display device has a housing, a rear projection screen, a mirrored surface, and a projector. An opening is formed in the upper surface of the housing. The rear projection screen is attached to the housing. The mirrored surface is disposed within the housing and angled to reflect light from the projector onto the rear projection screen. The projector is affixed within the housing and exposable through the opening for selective projection in one position through the opening onto the remote surface and in another position within the housing at the mirrored surface.

DETAILED DESCRIPTION OF THE INVENTION

Figure 1:
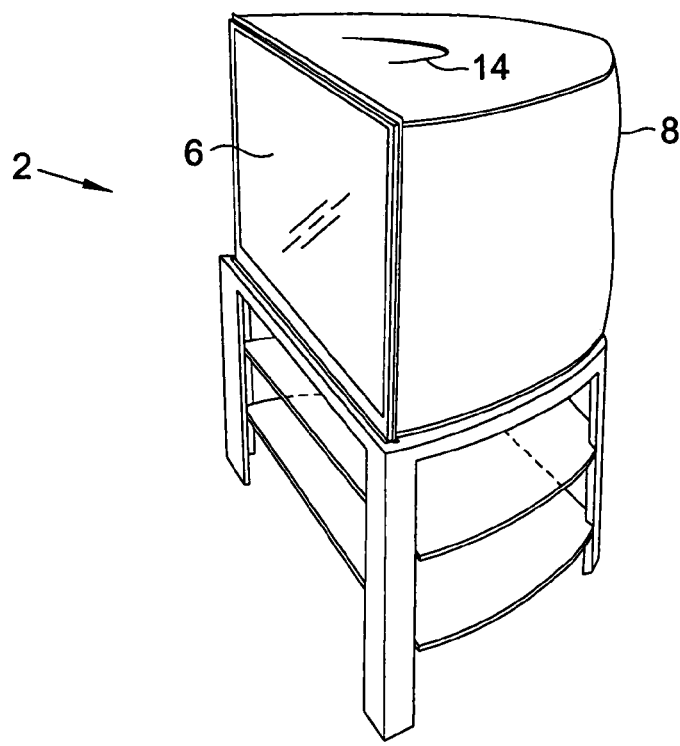
FIG. 1 is a front orthogonal diagram illustrating a first position of one embodiment of the present invention display device for projecting an image alternatively onto a remote surface and a rear projection screen.
Figure 2:
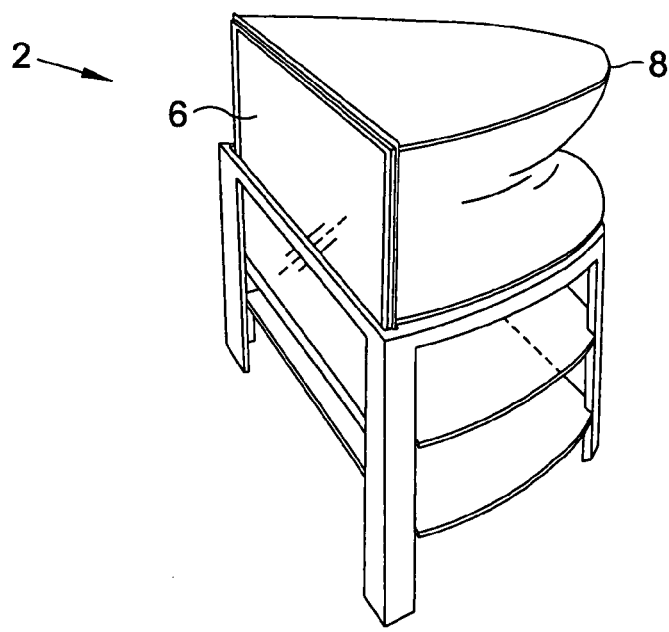
FIG. 2 is a front orthogonal diagram illustrating the display device shown in FIG. 1 with a partially collapsed housing.
Figure 3:
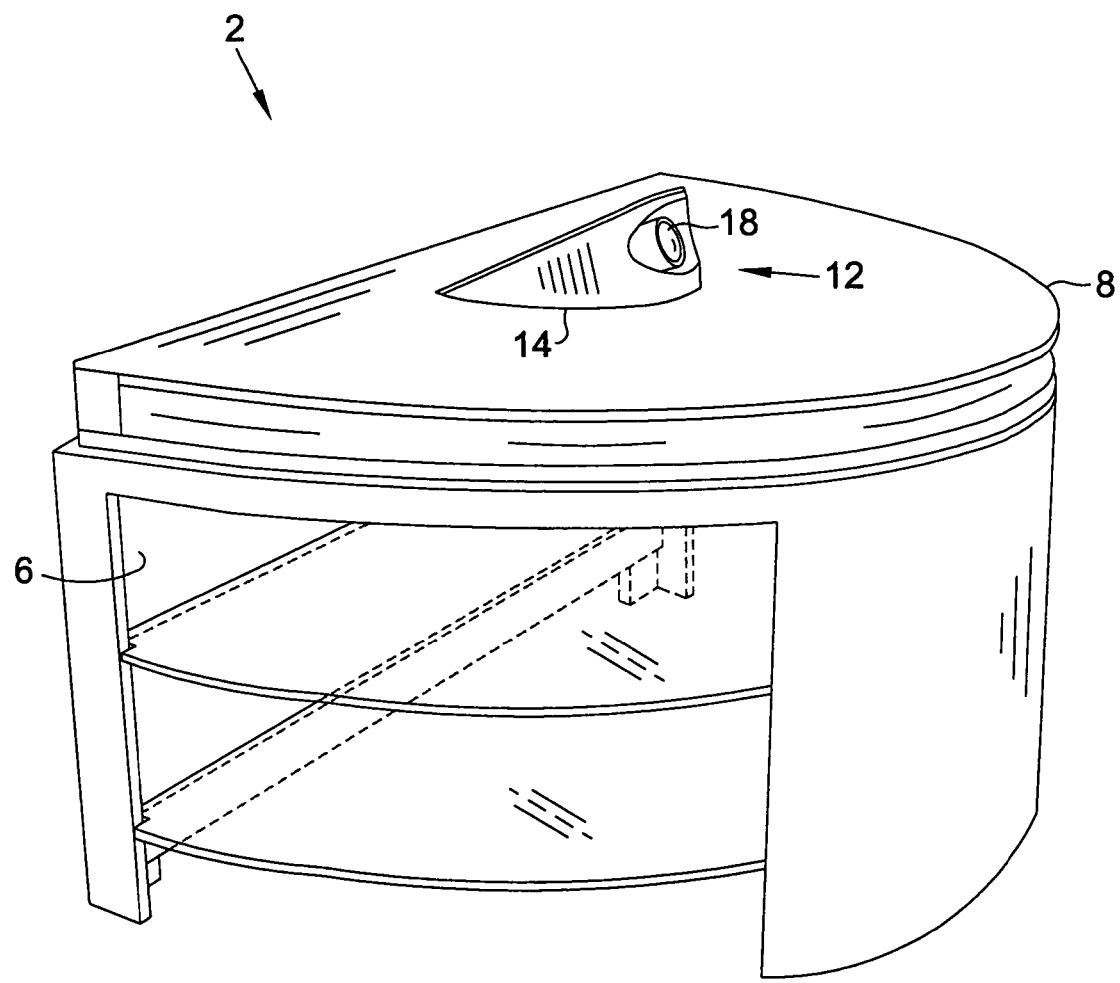
FIG. 3 is a rear orthogonal diagram illustrating a second position of the display device shown in FIG. 1.
Figure 4:
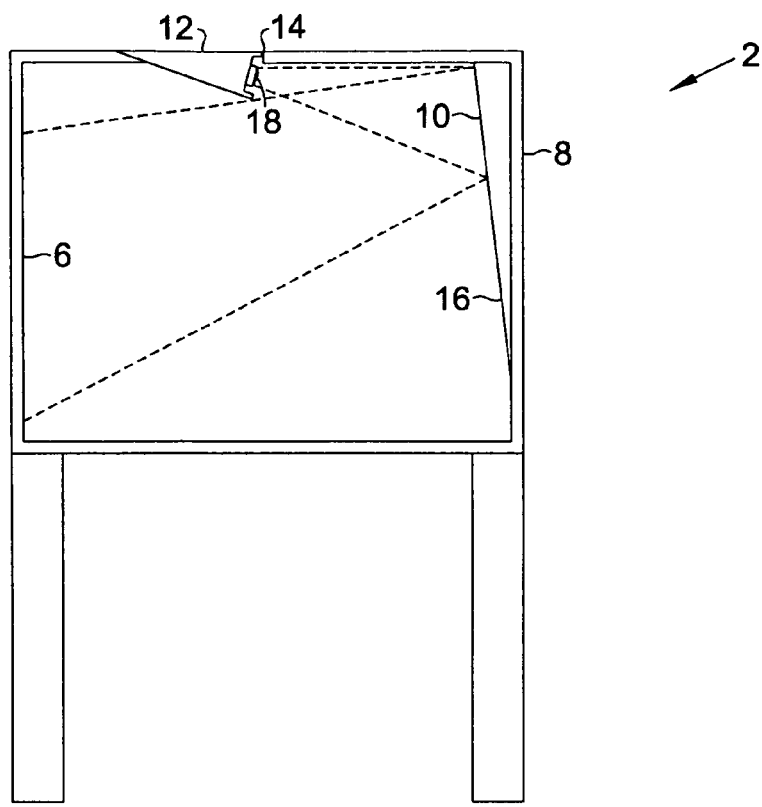
FIG. 4 is a cross-sectional illustration of one embodiment of the display device in the position shown in FIG. 1.
Figure 5:
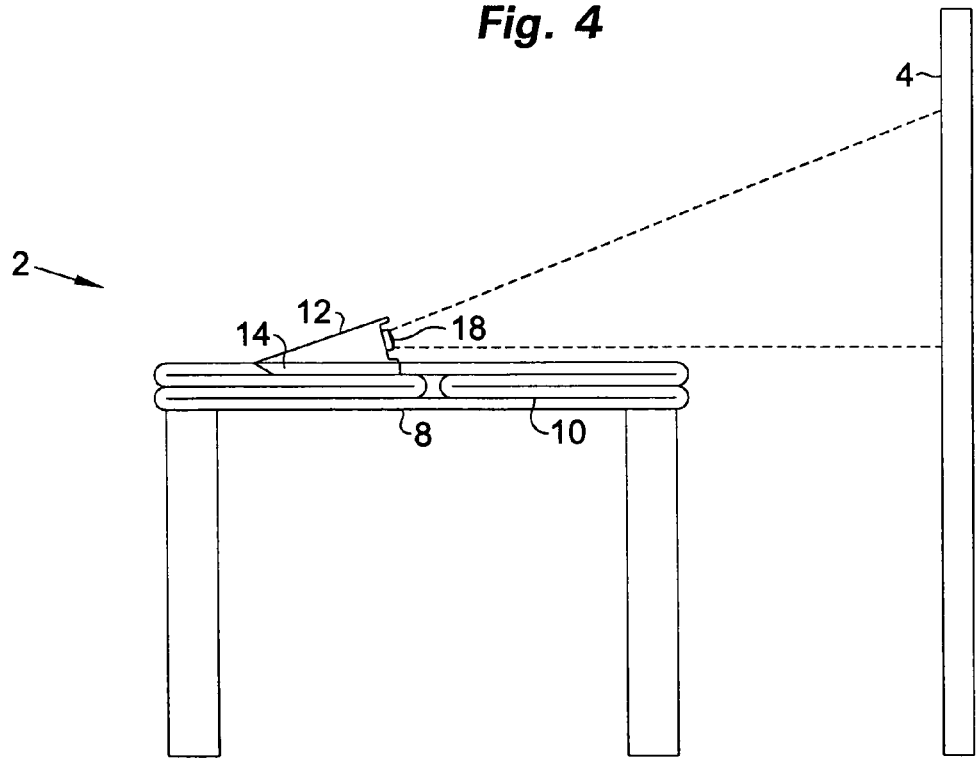
FIG. 5 is a cross-sectional illustration of one embodiment of the display device in the position shown in FIG. 3.
Figure 6:
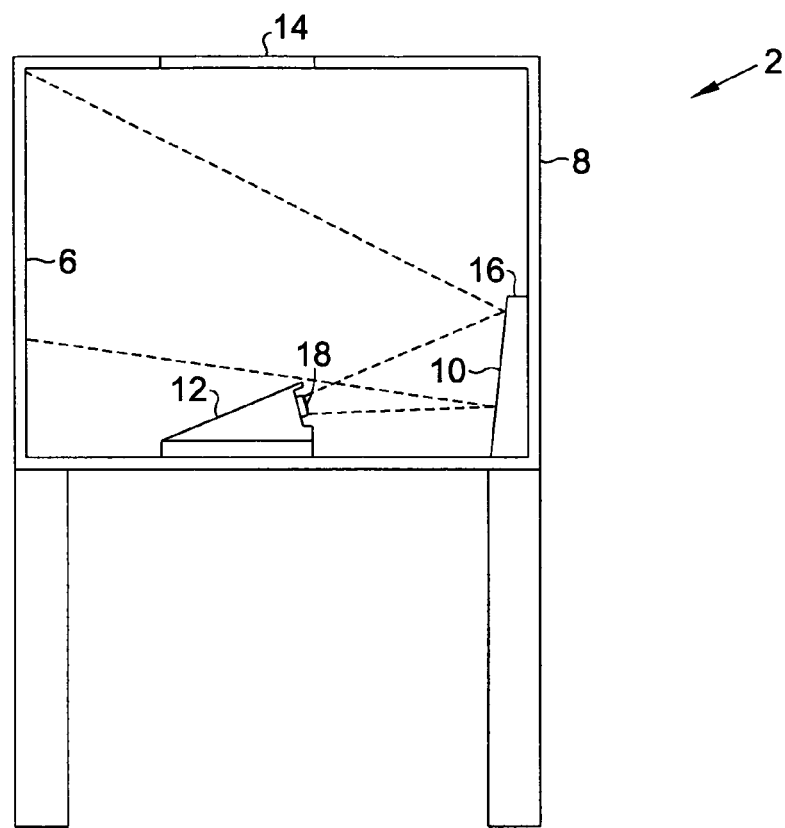
FIG. 6 is a cross-sectional illustration of another embodiment of the display device in the position shown in FIG. 1.
Figure 7:
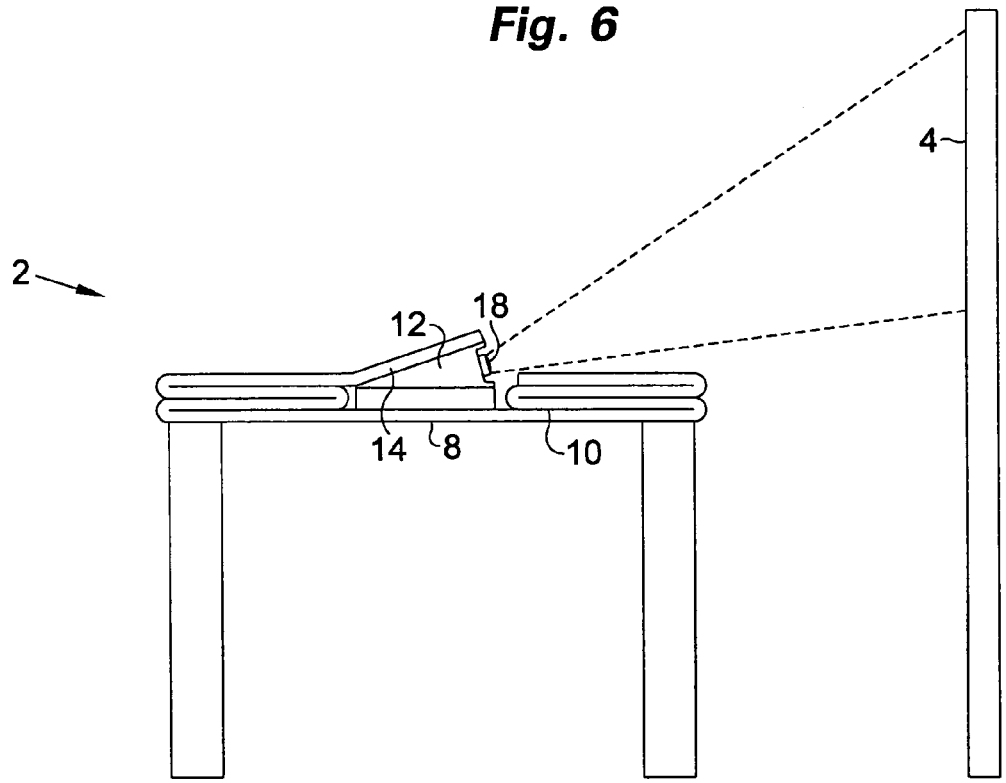
FIG. 7 is a cross-sectional illustration of another embodiment of the display device in the position shown in FIG. 3.

FIGS. 1–7 illustrate embodiments of display device 2. Display device 2 selectively projects an image onto remote surface 4 and rear projection screen 6. In one embodiment, display device 2 includes rear projection screen 6, housing 8, mirrored surface 10, and projector 12.

Rear projection screen 6 is any screen useful for receiving a projection on one side and transmitting the projection through to its other side. Rear projection screen 6 is any suitable size. Examples of suitable sizes range from 27 inches to 32 inches. Although, other sizes may be suitable a well. Rear projection screen 6 is attached to housing 8. In one embodiment, rear projection screen 6 is attached at the upper surface of housing 8.

In one embodiment, rear projection screen 6 is detachable from housing 8. In other embodiments, rear projection screen 6 is either flexible or moveable with respect to housing 8 so that housing 8 may be lowered to expose projector 12.

Housing 8 encloses mirrored surface 10 and one side of rear projection screen 6. In one embodiment, housing 8 is collapsible. Housing 8 is either constructed of a collapsible material or configured to fold onto itself to collapse.

In another embodiment, housing 8 is removable. In an alternate embodiment, housing 8 is fixed.

An opening 14 is formed in the upper surface of housing 8. Opening 8 allows projector 12 to be exposed from within housing 8.

Mirrored surface 10 is any light reflecting surface. Mirrored surface 10 is disposed within housing 8 and angled to reflect light from projector 12 onto rear projection screen 6. Although only one mirrored surface 10 is illustrated in the Figures, any number of mirrored surfaces 10 may be used to channel the light from projector 12 onto rear projection screen 6.

In one embodiment, display device 2 further includes support structure 16 for mirrored surface 10. Support structure 16 is any device or system configured to support mirrored surface 10 within housing 8. Examples of support structure 16 include tracks and tethers. In one embodiment, support structure 16 is collapsible within housing 8. In an alternate embodiment, support structure 16 is not collapsible.

Projector 12 is affixed within housing 8 and exposable through opening 14 for selective projection through opening 14. In one configuration, projector 12 projects onto remote surface 4. In another configuration, projector 12 projects within housing 8 at mirrored surface 10.

In one embodiment, projector 12 is exposed through opening 14 when housing 8 is collapsed. In an alternate embodiment, projector 12 is affixed to the upper surface of housing 8 and pivotable through opening 14. Projector 12 may be pivoted through opening 14 when housing 8 is collapsed or upright.

In one embodiment, projector 12 includes a lens 18. Lens 18 is adjustable to focus selectively on rear projection screen 6 and remote surface 4 depending on the configuration of display device 2. Remote surface 4 is any suitable distance from projector 12 and projector 12 projects an image of any suitable size onto remote surface 4. Examples of suitable sizes include 8 inches and over. Although, sizes of less than 80 inches may also be suitable.

Figure 8:
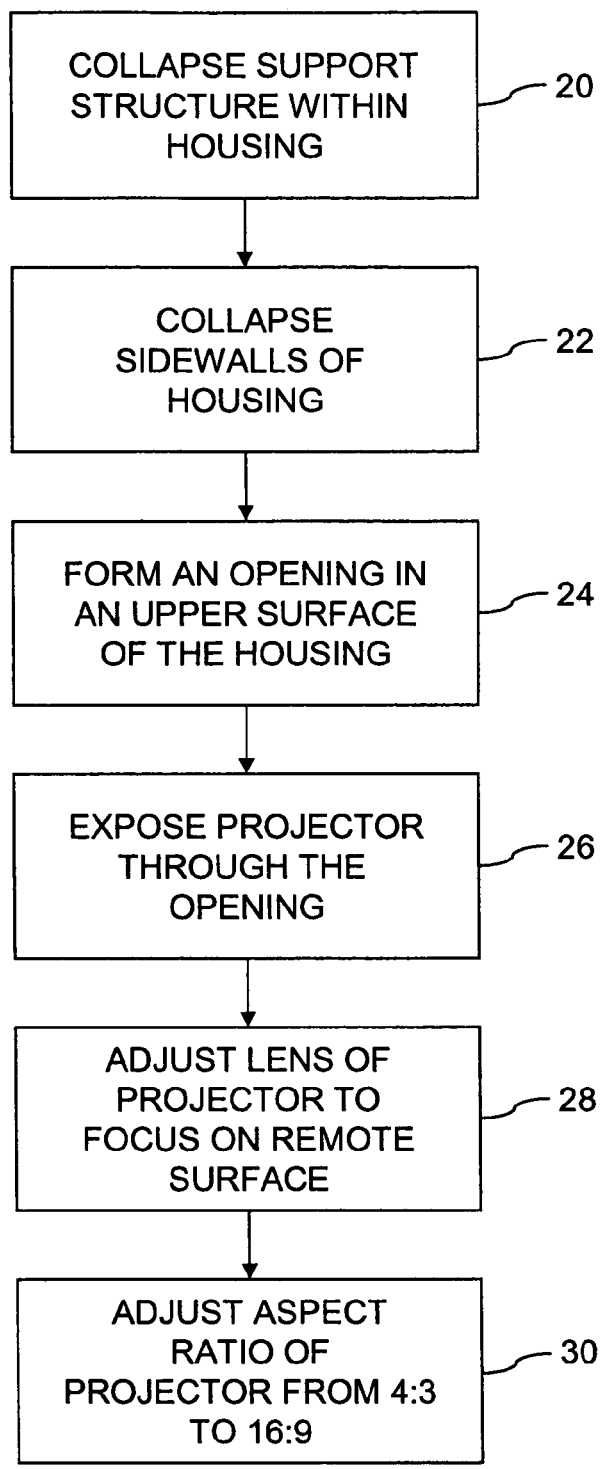
FIG. 8 is a flow chart illustrating one embodiment of the present invention method for converting a display device from a rear projection display device into a front projection display device.

FIG. 8 is a flow chart representing steps of one embodiment of the present invention method for converting a display device from a rear projection display device into a front projection display device. Although the steps represented in FIG. 8 are presented in a specific order, the present invention encompasses variations in the order of steps. Furthermore, additional steps may be executed between the steps illustrated in FIG. 8 without departing from the scope of the present invention.

Support structure 16 for mirrored surface 10 is collapsed 20 within housing 8 of display device 2. The way in which support structure 16 is collapsed 26 depends on the nature of support structure 16.

Housing 8 is collapsed 22. In one embodiment, collapsing 22 housing 8 includes lowering rear projection screen 6.

Opening 14 is formed 24 in the upper surface of housing 8. Opening 14 is formed 24 either by removing a portion of the upper surface of housing 8 or by pivoting projector 12. Projector 12 is exposed 26 through opening 14. Projector 12 is exposed 26 by either pivoting projector 12 through opening 14 or by lowering opening 14 around projector 12.

Additional optional steps may be implemented. For example, in one embodiment, lens 18 of projector 12 is adjusted 28 to focus on remote surface 4. In another optional step, an aspect ratio of projector 12 is adjusted 30 between 4:3 and 16:9.

Figure 9:
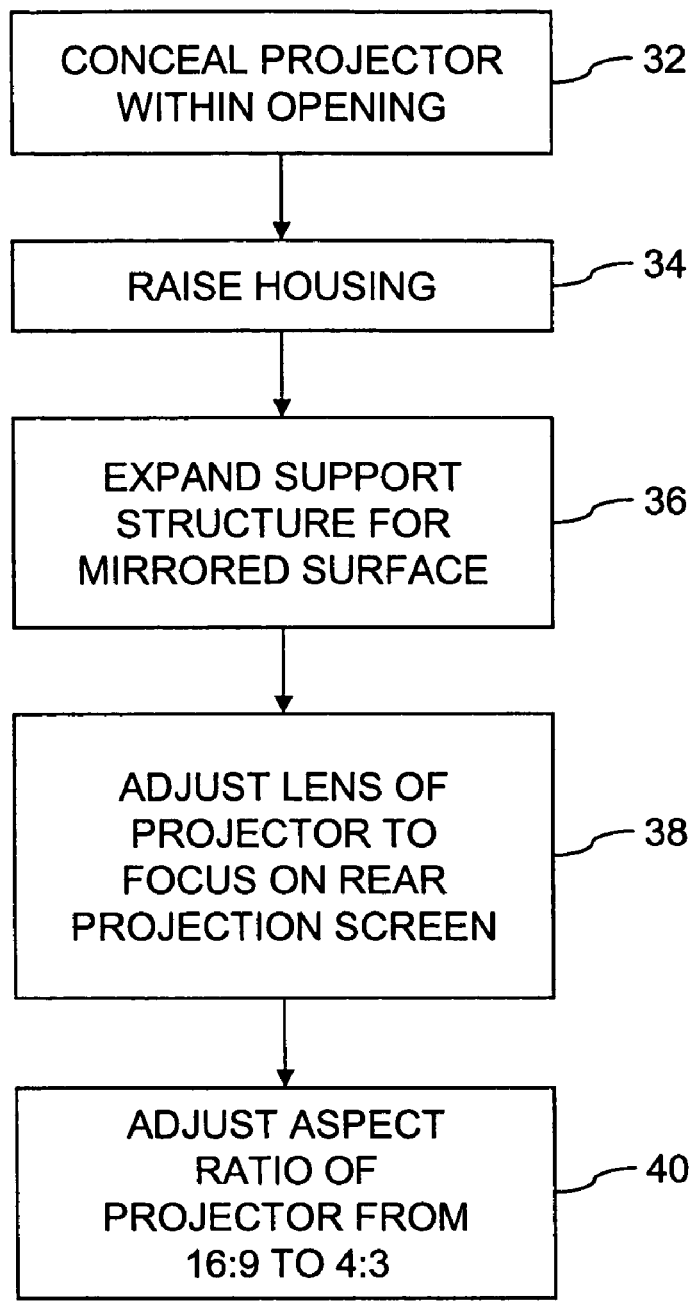
FIG. 9 is a flow chart illustrating one embodiment of the present invention method for converting a display device from a front projection display device into a rear projection display device.

FIG. 9 is a flow chart representing steps of one embodiment of the present invention method for converting a display device from a front projection display device into a rear projection display device, reversing the sequence and effect of the steps in FIG. 8. Although the steps represented in FIG. 9 are presented in a specific order, the present invention encompasses variations in the order of steps. Furthermore, additional steps may be executed between the steps illustrated in FIG. 9 without departing from the scope of the present invention.

Projector 12 of display device 2 is concealed 32 within opening 14 in the upper surface of housing 8. In one embodiment, concealing 32 projector 12 includes raising opening 14 around projector 12. In an alternate embodiment, projector 12 is affixed to the upper surface of housing 8 and projector 12 is concealed by pivoting projector 12 through opening 14.

Housing 8 is raised 34. In one embodiment, raising housing 8 includes raising rear projection screen 6. Support structure 16 for mirrored surface 10 is expanded 36 within housing 8.

Additional optional steps may be implemented. For example, in one embodiment, lens 18 of projector 12 is adjusted 38 to focus on rear projection screen 6. In another optional step, an aspect ratio of projector 12 is adjusted 40 between 16:9 and 4:3.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A display device for projecting an image alternatively onto a remote surface and a rear projection screen, the display device comprising:
   a housing having an upper surface with an opening formed therein;
   a rear projection screen attached to the housing;
   a mirrored surface disposed within the housing; and
   a projector affixed within the housing and exposable through the opening for selective projection through the opening onto the remote surface and within the housing at the mirrored surface disposed within the housing, wherein the mirrored surface is angled within the housing to reflect light from the projector onto the rear projection screen.

2. The display device of claim 1 wherein the housing is collapsible.

3. The display device of claim 2 wherein the projector is exposed through the opening when the housing is collapsed.

4. The display device of claim 1 wherein the projector is affixed to the upper surface of the housing and pivotable through the opening.

5. The display device of claim 1 wherein the rear projection screen is attached at the upper surface of the housing.

6. The display device of claim 1 wherein the rear projection screen is detachable from the housing.

7. The display device of claim 1 further including a support structure for the mirrored surface, wherein the support structure is collapsible within the housing.

8. The display device of claim 1 wherein the projector includes a lens adjustable to focus selectively on the rear projection screen and the remote surface.

9. A display device for projecting an image alternatively onto a remote surface and a rear projection screen, the display device comprising:
   a housing having an upper surface with an opening formed therein;
   a rear projection screen attached to the housing;
   a projector affixed to the upper surface of the housing;
   means for exposing the projector through the opening for selective projection through the opening onto the remote surface and within the housing; and
   means for reflecting light emitted into the housing from the projector onto the rear projection screen.

10. The display device of claim 9 further including means for collapsing the housing.

11. The display device of claim 10 wherein the means for collapsing includes collapsible sidewalls.

12. The display device of claim 10 further including means for exposing the projector through the opening when the housing is collapsed.

13. The display device of claim 9 wherein the means for exposing includes the projector affixed to the upper surface of the housing and means for pivoting the projector through the opening.

14. The display device of claim 9 wherein the rear projection screen is attached at the upper surface of the housing.

15. The display device of claim 9 wherein the rear projection screen is detachable from the housing.

16. The display device of claim 9 further including collapsible means for supporting the means for reflecting light.

17. The display device of claim 9 further including means for focusing light emitted from the projector selectively on the rear projection screen and the remote surface.

18. The display device of claim 9 further including means for adjusting an aspect ratio of the projector between 4:3 and 16:9.

19. A method for converting a display device from a rear projection display device into a front projection display device, the method comprising:
collapsing a support structure for a mirrored surface within a housing of the display device,
collapsing the housing of the display device,
forming an opening in an upper surface of the housing, and
exposing a projector of the display device through the opening.

20. The method of claim 19 wherein collapsing the housing includes lowering a rear projection screen.

21. The method of claim 19 wherein exposing the projector includes lowering the opening around the projector.

22. The method of claim 19 wherein the projector is affixed to the upper surface and wherein exposing the projector includes pivoting the projector through the opening.

23. The method of claim 19 further including adjusting a lens of the projector to focus on a remote surface.

24. The method of claim 19 further including adjusting an aspect ratio of the projector from 4:3 to 16:9.

25. A method for converting a display device from a front projection display device into a rear projection display device, the method comprising:
concealing a projector of the display device within an opening in an upper surface of a housing;
raising the housing of the display device,
expanding a support structure for a mirrored surface within the housing of the display device.

26. The method of claim 25 wherein concealing the projector includes raising the opening around the projector.

27. The method of claim 25 wherein the projector is affixed to the upper surface and wherein concealing the projector includes pivoting the projector through the opening.

28. The method of claim 25 wherein raising the housing includes raising a rear projection screen.

29. The method of claim 28 further including adjusting a lens of the projector to focus on the rear projection screen.

30. The method of claim 25 further including adjusting an aspect ratio of the projector from 16:9 to 4:3.

\* \* \* \* \*